A. VERNET.
MEANS FOR MOUNTING THE TOOLS OF MILLING MACHINES.
APPLICATION FILED AUG. 13, 1907.
997,024.
Patented July 4, 1911.
3 SHEETS—SHEET 1.
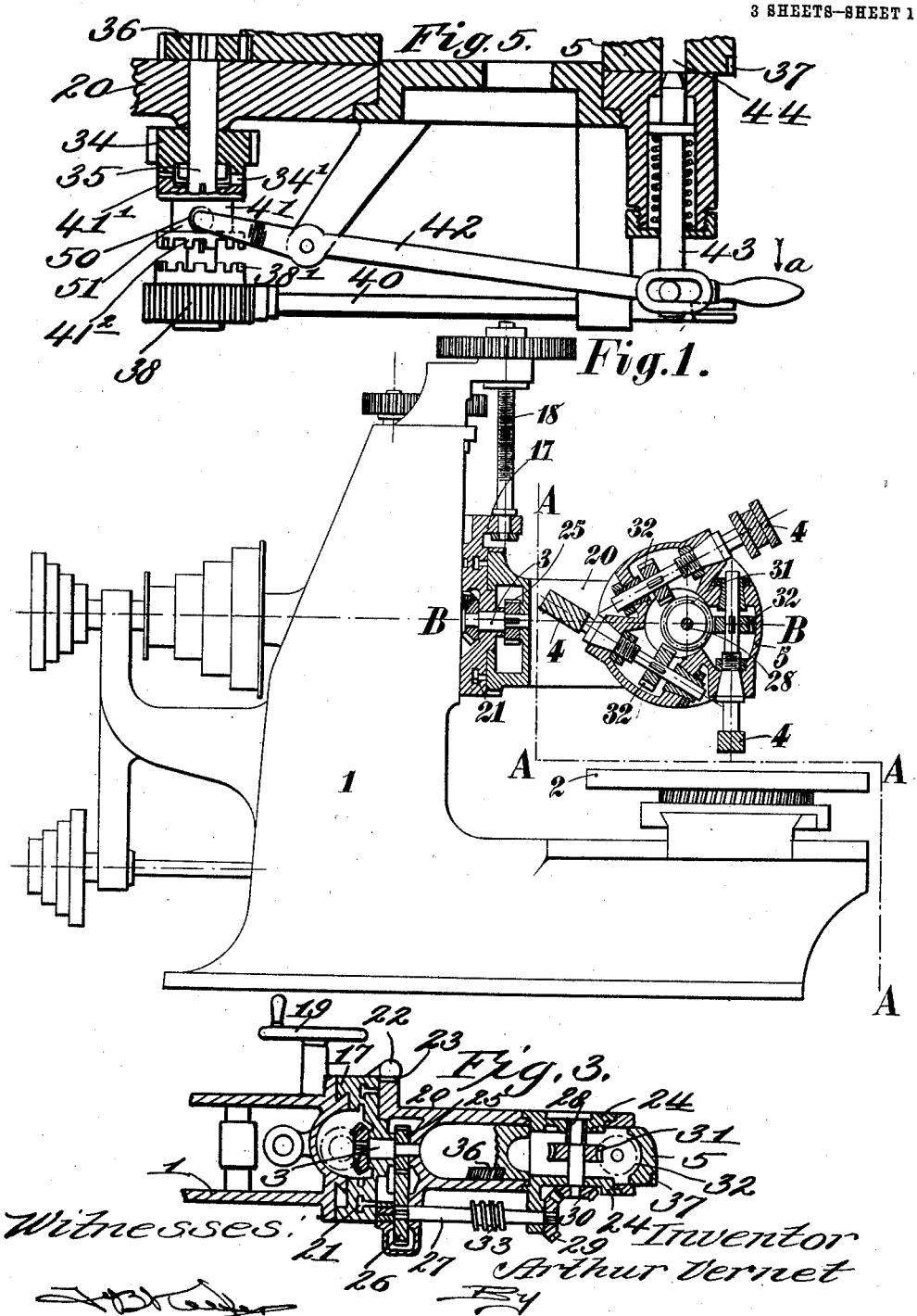

A. VERNET.
MEANS FOR MOUNTING THE TOOLS OF MILLING MACHINES.
APPLICATION FILED AUG. 13, 1907.
997,024.
Patented July 4, 1911.
3 SHEETS—SHEET 2.
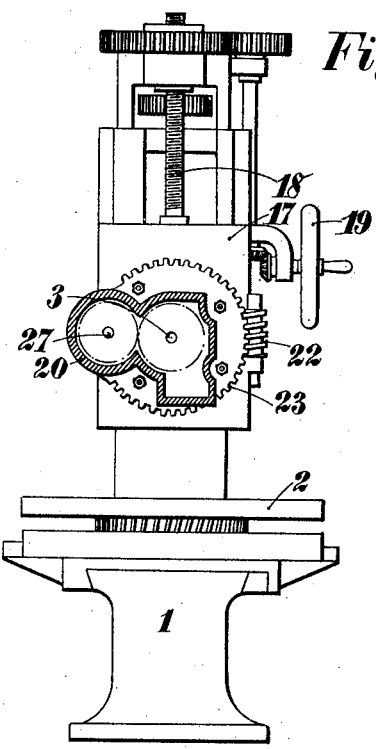
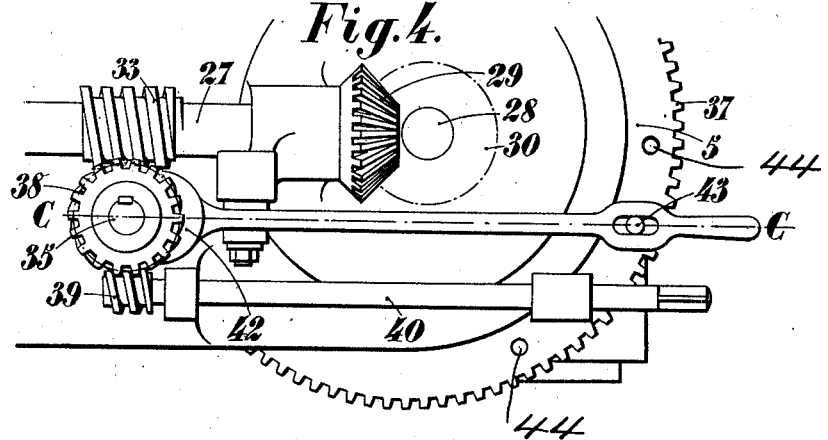

A. VERNET.
MEANS FOR MOUNTING THE TOOLS OF MILLING MACHINES.
APPLICATION FILED AUG. 13, 1907.

997,024.

Patented July 4, 1911.

3 SHEETS—SHEET 3.

Witnesses

Inventor
Arthur Vernet
By
James L. Norris
Atty.

UNITED STATES PATENT OFFICE.

ARTHUR VERNET, OF DIJON, FRANCE.

MEANS FOR MOUNTING THE TOOLS OF MILLING-MACHINES.

997,024.  Specification of Letters Patent.  Patented July 4, 1911.

Application filed August 13, 1907. Serial No. 388,378.

*To all whom it may concern:*

Be it known that I, ARTHUR VERNET, citizen of the French Republic, residing at Dijon, Department of Côte-d'Or, in France, have invented certain new and useful Improvements in Means for Mounting the Tools of Milling-Machines, of which the following is a specification.

The present invention is an improvement in milling machines, and more particularly in a milling machine of that type wherein is included a turret carrying a plurality of tools, the turret being so mounted as to be capable of a rotary movement, thereby enabling the tools to be successively brought into operative position with respect to the work on the work table.

For its principal object, the invention comprehends the production of a machine of the above specified type, having positive mechanism for effecting the rotations of the turret, positive means for terminating such rotation as each tool is brought into operative position, and positive mechanism for driving the tool when such position is reached.

The invention further resides in the arrangement of the tools in such a manner that their axes form approximately an inscribed regular polygon with respect to the circular turret, this arrangement having the important advantage that the operator is enabled to manipulate the rotating tool without being impeded by the inoperative tools.

Figure 6:
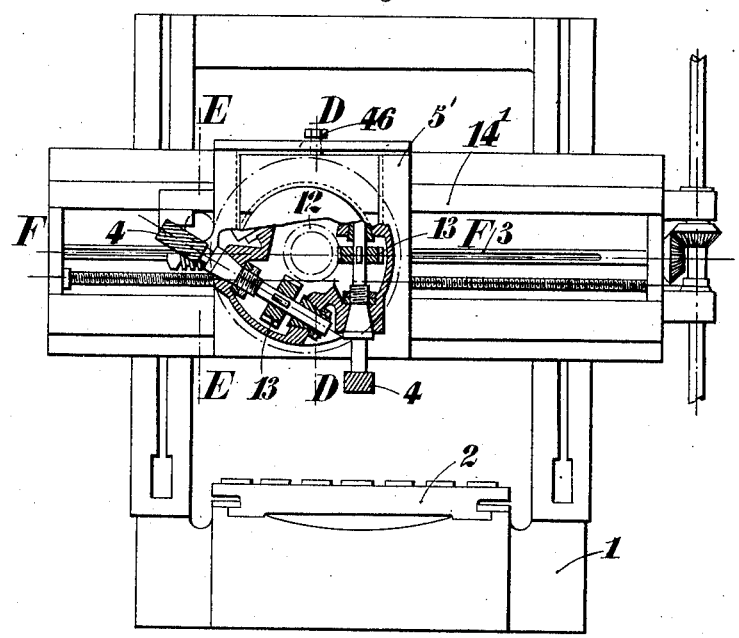
Figure 8:
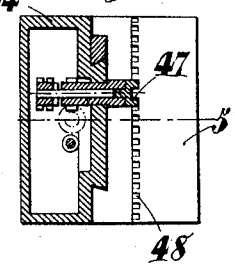
Figure 7:
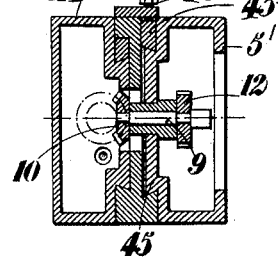
Figure 9:
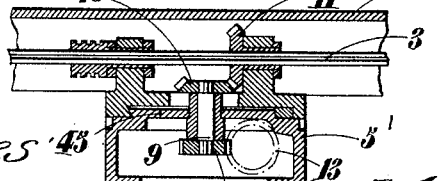

A practical embodiment of the invention is illustrated in the accompanying drawings, wherein:

Figure 1 is a side elevation, partly in section, of the improved machine. Fig. 2 is a vertical section taken on the line A—A—A—A of Fig. 1. Fig. 3 is a horizontal section taken on the line B—B of Fig. 1. Fig. 4 is an enlarged detail view, in elevation, of the mechanism for controlling the turret. Fig. 5 is a horizontal section on the line C—C of Fig. 4. Fig. 6 is a front elevation, partly in section, of a milling machine having a table of the planing machine type. Figs. 7, 8 and 9 are sections taken, respectively, on the lines D—D, E—E, and F—F of Fig. 6.

Reference being had to said drawings, 1 designates the frame of the machine, and 2 the work table.

In Figs. 1 to 5, there is shown a carriage 17 slidable vertically against the front face of the frame and adjustable through the medium of a screw 18 operated by a hand wheel 19. From this carriage projects a forked, horizontal cross-piece 20 attached thereto by T-shaped fastening devices fitted in a corresponding circular groove 21 formed in the body of the carriage. The cross-piece may be rotated about the drive shaft 3 of the machine as an axis by means of a worm 22 in mesh with the teeth of a worm gear 23 with which the cross-piece is provided. Shaft 3 in turn has suitable driving connections of any desired type with the main source of power of the machine. In the fork of the cross-piece there is mounted the circular turret 5 which carries the three cutting tools 4 and is held in place by a pair of flanged rings 24. The turret is designed to rotate upon an axis at right angles to that of the cross-piece, its shaft 28 having its ends journaled in bearings in the above mentioned rings. This shaft, however, is arranged eccentric to the turret, while the arrangement of the three cutters with respect to the latter is such that their axes form approximately an inscribed regular triangle. See Fig. 1. The rotation of the turret will, therefore, bring the cutters successively into operative position with reference to the work upon the table 2, as will be apparent, each cutter upon reaching such position being driven by means of its spiral toothed or helicoidal pinion 32, which is in mesh at that time with a similar pinion 31 secured to shaft 28. To effect the rotation of shaft 28, it is provided at one end with a bevel pinion 30 which meshes with and is driven by a bevel pinion 29 secured to the adjacent end of a shaft 27 carried by and arranged parallel with the cross-piece 20, the other end of the last mentioned shaft having attached thereto a spur pinion 26 which in turn is in mesh with a similar pinion 25 secured to the drive shaft 3. The turret itself may be rotated either automatically or manually. Its periphery is formed with a rack 37 engaged by a pinion 36 keyed to a shaft 35 carried by the cross-piece 20 arranged below and at right angles to shaft 27, which latter is provided with a worm 33 meshing with a helicoidal pinion 34 loosely mounted on shaft 35, one face of said pinion having clutch teeth 34[1] formed thereon. Shaft 35 also carries a second loose helicoidal pinion 38 having a clutch face 38¹. Pinion 38 meshes with a worm 39 formed upon one end of a shaft 40 arranged parallel with and below shaft 27 and having its other end squared. (Figs. 4 and 5.)

Between the pinions 34 and 38 there is keyed to the shaft 35 for sliding movement a sleeve 41 having clutch faces 41¹ and 41² and formed with a continuous peripheral groove 51 in which works a pair of rollers 50, the width of the groove being sufficiently greater than the diameter of the rollers to afford the latter a limited lateral play therein. These rollers are attached to the terminals of the fork formed on the inner end of the clutch lever 42. Lever 42 is provided adjacent its handle end with an eye in which works a pin formed upon the outer end of a spring-pressed bolt 43, whose beveled inner end is arranged for engagement in a series of notches 44 formed in the adjacent face of the turret. If, then, the free end of the bolt is engaged in one of these notches, it will be apparent that the turret is locked against rotation and will remain stationary until the handle end of the lever is shifted manually in the direction indicated by arrow $a$, Fig. 5, so as to release the bolt from such engagement and to engage the clutch face 41¹ of sleeve 41 with the clutch face 34¹ of pinion 34, whereupon the turret will be rotated automatically through the medium of the following elements: shaft 3, pinions 25 and 26, shaft 27, worm 33, pinion 34, shaft 35, pinion 36 and rack 37. When the notch passes beyond the bolt end, the lever is released; the bolt will then move slightly inward under the influence of its spring, its free end bearing against the dressed face of the turret. The movement of the forked end of the lever consequent upon its handle end being released, is permitted by the play existing between the rollers 50 and the sleeve 41, so that the latter is not disengaged from pinion 34. The turret will thus continue its rotation until the succeeding notch comes into alinement with and receives the bolt end, thereby terminating such rotation. As the bolt end moves into this new notch, the sleeve is shifted in the opposite direction, its clutch face 41² engaging the clutch face 38¹ of pinion 38. The bolt is then again released from engagement with the turret without, however, disengaging the two clutch faces 38¹ and 41². The shaft 40 may then be rotated manually by the application of a handle or other instrumentality to its squared end, thereby completing the adjustment of the turret. Thus it will be apparent that this form of the invention includes mechanism for rotating the turret, to bring the cutters or other milling tools successively into operative position with reference to the work on table 2, means whereby such rotation may be terminated when a tool reaches this position, and mechanism for rotating the tool at that time.

The form of the invention shown in Figs. 6 to 9 is a table milling machine of the planing machine type. On the uprights of the frame 1 is arranged the vertically-adjustable carriage 14¹ which carries the laterally-adjustable turret 5¹. This element, which is similar in the main to that already described, has formed upon its rear face an annular dove-tail rib 45 held in a correspondingly shaped groove formed in the carriage 14¹ by a tightening wedge 45¹ operated by a bolt 46. The turret may be rotated upon its axis by means of a circular rack 48 with which it is provided, the rack being engaged by a pinion 47 mounted upon a shaft carried by the carriage and having a suitable driving connection with the drive shaft 3.

What is claimed is:

1. In a machine of the class described, the combination of a carriage; a drive shaft, a transmission shaft and a tool support carried thereby; driving connections between said shafts; a shaft mounted in said support; a plurality of tools carried by said support; an annular rack provided upon said support; driving connections between said transmission shaft and rack for rotating said support, to bring said tools successively into operative position relatively to the work on the table; driving connections between said transmission shaft and the third-named shaft; and driving connections between said third-named shaft and said tools, for rotating each tool when it reaches such position.

2. In a machine of the class described, the combination of a work table; a circular tool support rotatable relatively thereto; a plurality of tools carried by said support and having their axes so arranged as to form a regular polygon inscribed in said support, said tools being adapted to be brought successively into operative position relatively to the work on the table during the rotation of the support; a pinion secured to each tool; a drive shaft mounted eccentrically with respect to the axis of said support; and a driving gear secured to said shaft and adapted for operative engagement with the gear on each tool as the latter is brought into operative position.

In testimony whereof I have hereunto set my hand in presence of two subscribing witnesses.

ARTHUR VERNET.

Witnesses:
ERNEST MOUILLORN,
JEAN BAPTISTE MONING.

---

Copies of this patent may be obtained for five cents each, by addressing the "Commissioner of Patents, Washington, D. C."